United States Patent [19]

Brown

[11] 3,883,697

[45] May 13, 1975

[54] DIGITAL CONFERENCE CIRCUIT

[75] Inventor: Colin R. Brown, Nutley, N.J.

[73] Assignee: International Telephone and Telegraph Corporation, Nutley, N.J.

[22] Filed: Oct. 18, 1973

[21] Appl. No.: 407,686

[52] U.S. Cl. .............................................. 179/18 BC
[51] Int. Cl. .............................................. H04m 3/56
[58] Field of Search .................................. 179/18 BC

[56] References Cited

UNITED STATES PATENTS

| | | | |
|---|---|---|---|
| 3,551,600 | 12/1970 | Berch | 179/18 BC |
| 3,692,947 | 9/1972 | Lewis | 179/18 BC |
| 3,735,359 | 5/1973 | Wagner | 179/18 BC UX |
| 3,748,394 | 7/1973 | Thomas | 179/18 BC |
| 3,787,630 | 1/1974 | Carbrey | 179/18 BC |
| 3,796,833 | 2/1974 | Lewis et al. | 179/18 BC |

*Primary Examiner*—William C. Cooper
*Attorney, Agent, or Firm*—John T. O'Halloran; Menotti J. Lombardi, Jr.; Alfred C. Hill

[57] ABSTRACT

The conference circuit disclosed employs a time sharing technique and is all digital in nature providing for 30 conferees to be engaged in up to 10 different conferences and places no restrictions on which conference channel may be associated with any particular channel. The circuit includes a main memory in which is stored conference identity words defining the channels on which a particular conference may take place and in which is stored the speech of a conferee associated with the appropriate conference identity word. A 30 state counter controls the addressing of the main memory and a secondary memory into which the conferee's speech is transferred from the main memory under control of a speech detector connected to the TDM input highway. The output of the secondary memory is transmitted on the appropriate channel of the output TDM highway to the other conferees associated with the conference in process. An idle code signal is provided for transmission to the conferee just detected as doing the talking.

14 Claims, 2 Drawing Figures

DIGITAL CONFERENCE CIRCUIT

BACKGROUND OF THE INVENTION

This invention relates to a conference circuit and more particularly to a conference circuit for an automatic telephone exchange.

There are two known types of conference circuits now in use. The first type is an anlog conference circuit employing a mixed analog and digital switch. However, this type of conference circuit introduces severe peaks of traffic across the intermatrix units which conferences with several digital subscribers would cause. The second type is a conference circuit based on digital-to-analog conversion followed by analog mixing and analog-to-digital conversion. In this type of conference circuit employs an encoder/decoder for each channel and occupies one integrated circuit card. Therefore, if it is required to enable ten conferences of five conferees each 50 cards would be required for the encoder/decoders alone. Further, if five part mixing type conference circuits are connected in tandem to assemble large conferences degradation of speech quality will occur because of the accumulative quantizing errors.

SUMMARY OF THE INVENTION

An object of this invention is to provide a digital conference circuit overcoming the above-mentioned disadvantage.

Another object of this invention is to provide a digital conference circuit capable of handling simultaneously a large number of conferences each having a large number of conferees employing a reduced amount of hardware and having improved speech quality as compared to the above-mentioned digital type conference circuit.

A feature of the present invention is the provision of a digital conference circuit for an automatic telephone exchange comprising: a first TDM signal (time division multiplex) input highway from the exchange to the circuit; a second TDM signal output highway from the circuit to the exchange; a main memory having M storage sections each associated individually with each of M channel of the TDM signal, where M is an integer greater than one; addressing means coupled to the main memory to select in sequence each of the storage sections; inputs from the exchange coupled to the main memory to set up a conference for N subscribers, the conference being identified by a given digital number which is stored in each of N of the storage sections, each of the N subscribers being connected to the circuit as a different one of N of the channels of the TDM signal, each of the N channels corresponding to a different one of the N of the storage sections, where N is an integer greater than one but less than M and detection and storage means coupled to the addressing means, the first and second highways and the main memory, the detection and storage means being responsive to speech from one of the N subscribers in the conference to cause code representations of each speech sample from the one of the N subscribers to be transmitted to the others of the N subscribers in the conference over the second highway in the appropriate ones of the N of the channels of the TDM and to transmit a no-signal code to the one of the N subscribers over the second highway in the appropriate one of the N of the channels of the TDM signal.

BRIEF DESCRIPTION OF THE DRAWINGS

Above-mentioned and other features and the objects of this invention will become more apparent by reference to the following description taken in conjunction with the accompanying drawing, in which.

DESCRIPTION OF THE PREFERRED EMBODIMENTS

Figure 1:
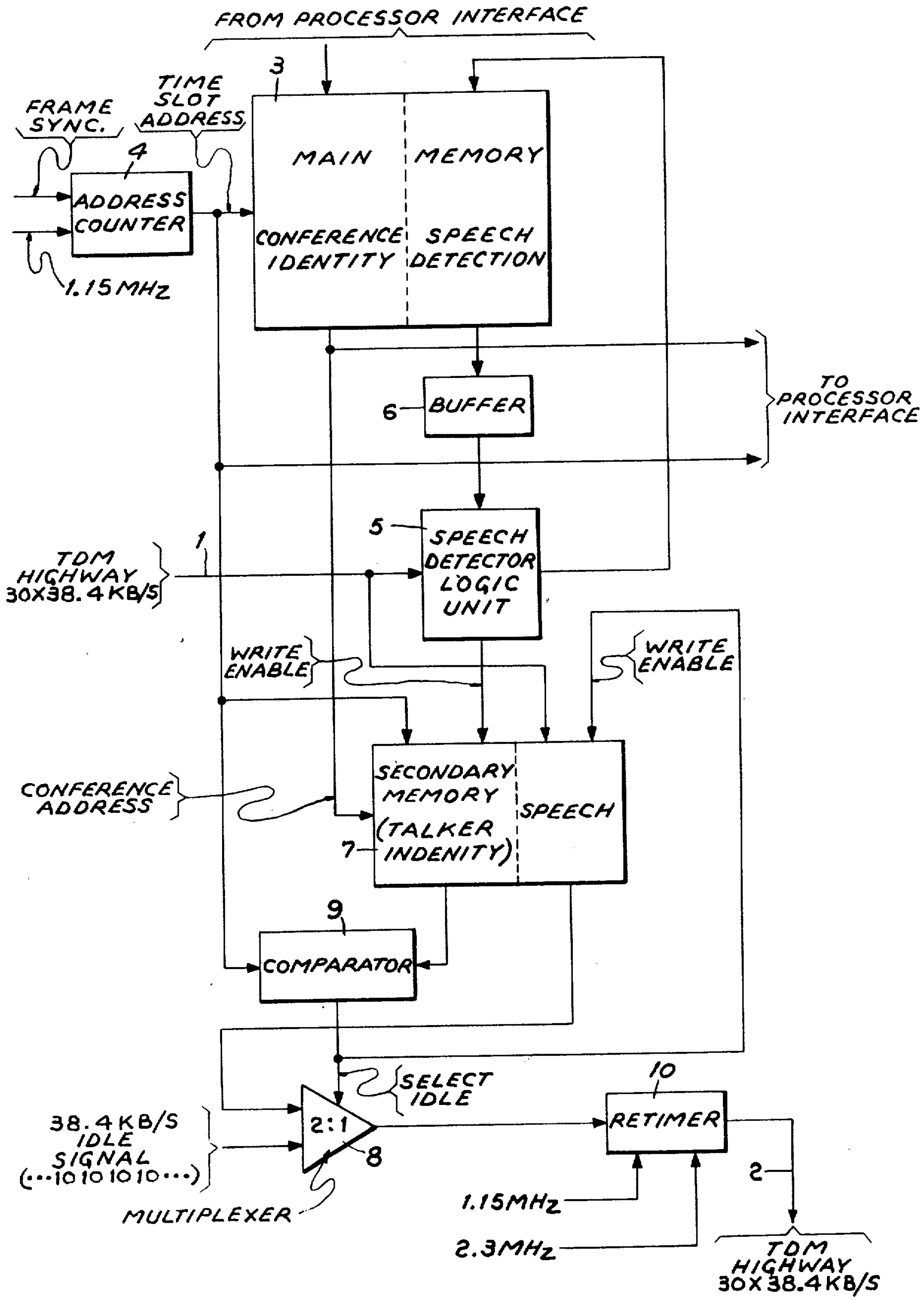
FIG. 1 is a schematic block diagram of a digital conference circuit in accordance with the principles of the present invention.

The digital conference circuit shown in FIG. 1 is for use in a telephone exchange where speech is conveyed using delta modulation. That is, when a subscriber's line is scanned during the time division multiplex (TDM) cycle the code transmitted is a binary 1 or a binary 0, depending on whether the speech sample is greater than or less than the previous sample. Since only one bit per channel is sent the sampling rate is higher than would be used in a conventional PCM system. The conference circuit is based on the principle of detecting the talker by examining the digital bit streams received from the conferees, broadcasting the talker's bit stream to the other conferees, and sending an idle code to the talker so that he does not receive his own speech. Thus, the circuit is similar in many respects to that described in British Pat. No. 1,234,419.

Talker detection is based on the fact that at the beginning of a speech burst the encoder in use, assuming syllabically-companded deltasigma modulation, produces a string of 1's or a string of 0's, as it attempts to charge up the syllabic time constant, while between speech bursts the output of the encoder approximates a string of alternate 1's and 0's. Thus, when a conferee is quiescent, the occurrence on his connection to the conference circuit of a known number of successive 1's or 0's is interpreted as speech. The number of successive like bits is assumed to be in the range of 3 to 15, the number actually selected depending on the system.

As shown the conference circuit is connected via a 30-channel TDM (time division multiplex) highway 1 to a TDM telephone switching center, and the sampling rate used is 38.4 KHz (kilohertz). Thus, each channel in use for a subscriber conveys a bit stream at 38.4 Kb/s (kilo bits per second). This compares with the conventional TDM/PCM sampling rate of 8 KH. The outgoing TDM highway is shown at 2.

The main memory 3 has inputs as shown from an interface between the conference circuit and the exchange processor. These inputs are used by the processor to supply the appropriate information to the conference circuit when a conference is being set up. Memory 3 contains one word per channel on the highways 1 and 2, i.e. 30 words, and is addressed in synchronizm with the multiplex on the highways, under control of a 30 state counter 4. Memory 3 has two storage fields, a speech detection field on the right-hand side and a conference identity field on the left-hand side. Counter 4 has inputs from a clock pulse source at 1.15 MHz (megahertz) and from the exchange's frame synchronization circuitry.

The speech detection field is associated with a speed detection logic unit 5 connected to highway 1. Unit 5 reads data from the speech detection field via a buffer 6, and for each channel writes into the field the last bit received and a count of the number of successive 1's or 0's received in each channel's time slot. Thus, for each channel the speech detection field has four bits, one for the last bit and three for the count. Whenever a 1 to 0 or a 0 to 1 transistion is detected, unit 5 clears the count. The detection of such a transition is effected by comparing the bit on highway 1 with the bit read from the store, in a manner analogous to the "last-look" method of line scanning. When logic unit 5 detects that the count for a channel has reached the talker detection threshold, i.e.; the preselected number of successive 1's or 0's, it produces a pulse on the time slot of the channel concerned. This pulse is applied via a write enable lead to a secondary memory 7, which will be further described later.

The conference identity field of main memory 3 stores for each channel the identity of the conference in which it is involved. Note that the conference circuit shown can be used for any number of conferences, which can be of any desired sizes, up to its maximum capacity. Thus, the conference circuit could serve, for instance, for one 30-line conference, or for a 5-line conference plus a 10-line conference plus a 4-line conference plus 11-line conference. The field is used in each time slot to address a word in secondary memory 7.

Secondary memory 7 contains one word for each conference. Thus, with 30 channels memory 7 would need at the most 10 words. Each word has two fields, one to define the talker within the conference, and the other a single bit (1 or 0) to store that talker's speech information.

When a conference is being set up, the processor receives from one of the conferees signals "telling" it that a conference is needed, and listing the conferees. The processor then checks main memory 3 to determine which words are not in use for conference, and can thus handle the required conference. It connects the conferees via the exchange switching equipment to free channels on highways 1 and 2 corresponding to unused words in main memory 3. It also sends the data for the conference to memory 3, receiving while this is being done information from memory 3 and its address counter 4. These operations occur in what is now a relatively conventional manner, and are thus not described herein.

When speech detection logic unit 5 produces an output pulse in response to the detection of a speech burst from a conferee, it causes the current setting of address counter 4 to be written into the "talker field" of secondary memory 7. This writing is effected at an address of secondary memory 7 which corresponds to the identity of the conference one of whose talkers has just commenced to talk. This conference identity is obtained from the read out from main memory 3, and the writing thereof into secondary memory 7, labels the channel on which speech has been detected as the talker in the conference concerned.

When each word in main memory 3 relating to a channel in use for a conference is read, the conference identity field of that word is used to address the word in secondary memory 7 which corresponds to its conference. Thus, each word in secondary memory 7 which contains recorded information is addressed three or more times in each cycle. When this secondary memory addressing occurs, the talker field read therefrom is compared with the current setting of address counter 4 to determine whether the channel whose word in main memory 3 has just been addressed, and whose speech information appears on highway 1 is the talker in that conferee. If it is the current talker, the incoming speech bit is written into the speech field of secondary memory 7 and an idle code bit is gated onto outgoing highway 2, i.e., back to the TDM switching equipment. Thus, the talker "receives" silence, while the other conferees receive the talker's speech. This gating out of the idle code is effected via a multiplexer 8 which is controlled by a comparator 9. comparator 9 receives the current settings from address counter 4, and when the talker' s address is read from memory 7 at the talker's own time position, multiplexer 8 is activated to include the idle signal. Hence, at the talker's time position the "silent code" (an alternation of 1's and 0's for delta modulation) is sent out.

Multiplexer 8 in effect has two different operating conditions one or the other of which is enabled, depending on circumstances. Thus, when idle code is to be sent multiplexer 8 gates that code to a retimer 10 which feeds highway 2. When a speech code from a talker is to be sent to one of the other conferees, an output from the speech section of memory 7 is gated therefrom through multiplexer 8 to retimer 10. Retimer 10 receives, in addition to code for transmission, clock pulses at two frequencies as indicated to control the reshaping and synchronization of the TDM signal sent on highway 2.

If two or more of the conferees talk at once, the conference circuit switches back and forth between them, which provides an interrupt capability - i.e. any conferee can interrupt if necessary. However, this will, of course, impair the intelligibility.

In the preceding description, some mention was made of the processor interface. This includes some "hardware" additional to that used for normal call control, so that the conference identity field of the main memory can be interrogated and updated as required. The additional hardware would provide the following capabilities:

a. In response to a "normal interrogate" instruction it would produce, a "bit map," indicating the conference identities in use.

b. In response to a "set" instruction, it would load a specified conference identity into a specified main memory location. Such an instruction would also clear a memory location.

c. In response to a "release" instruction, all stored entries in main memory 3 which relate to a specified conference would be erased.

d. In response to a "read" instruction the conference identity stored at a specified main memory location would be indicated.

Figure 2:
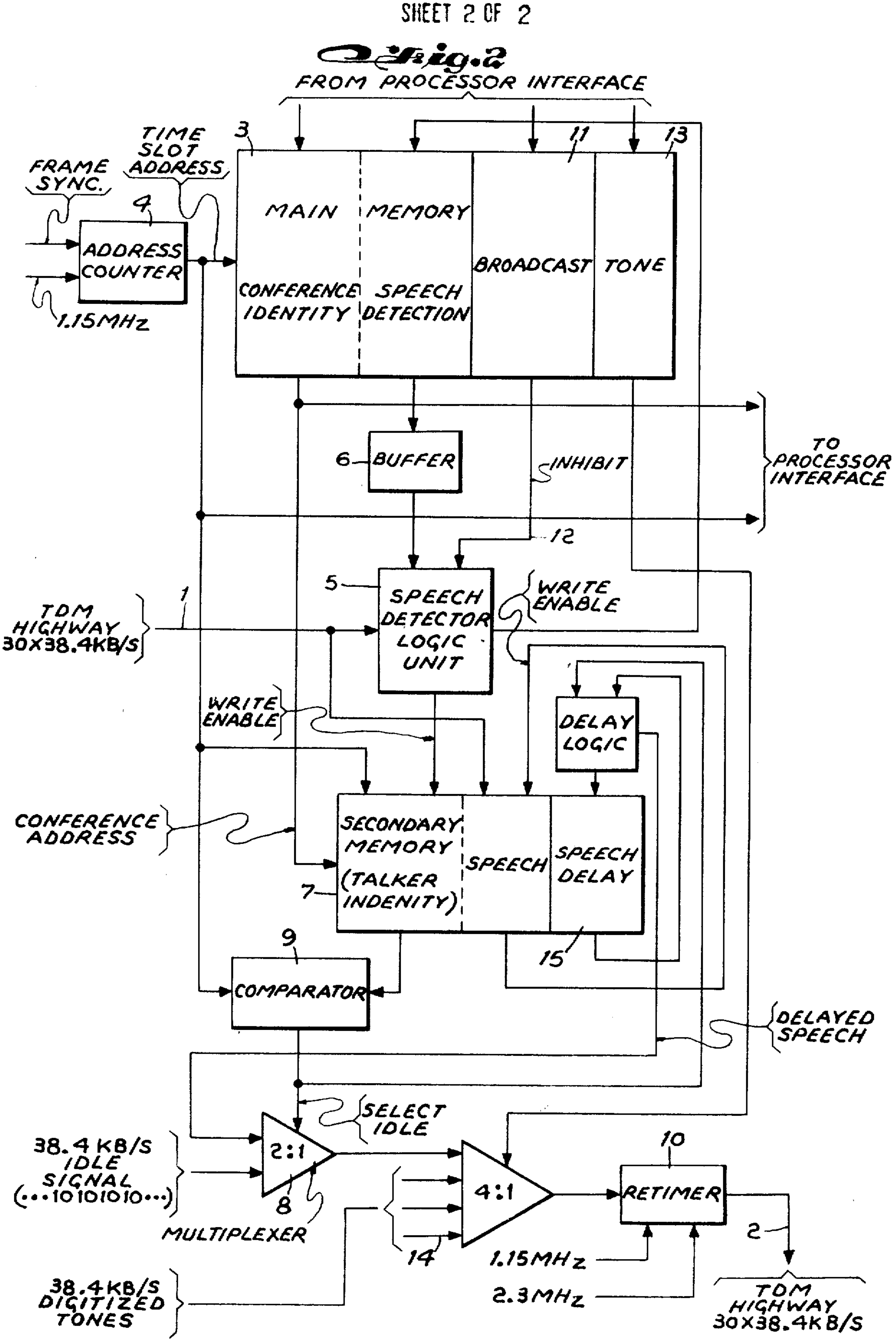
FIG. 2 is a schematic block diagram of the circuit of FIG. 1 having additional circuits added thereto to render the digital conference circuit of FIG. 1 more versatile.

Certain additional facilities can be provided for the circuit of FIG. 1 as indicated in FIG. 2. First an additional bit storage portion 11 could be provided in each word (storage section0 of section) memory 3. This bit, when set by the exchange processor, inhibits the operation of speech detection logic unit 5 via the connection 12, which makes it possible to inhibit channels involved in a conference from ever being detected as talking thus giving a broadcast facility. The tone to be sent to a given channel would be specified by a word written by the processor in the tone field 13 of main memory 13. This word would cause multiplexer 14 to replace conference speech by the specified tone (in digital form).

Speech delay storage field 15 may be needed if the method of talker detection, i.e. looking for a bit stream of 1's or 0's, or other circumstances causes unwanted clipping of the commencement of each speech burst. This could present problems if it is desired to connect conference circuits, perhaps located at different exchanges, in tandem either to economize on interexchange trunk channels or for large conferences. The design hitherto described clips the information bits by which it detects the start of the talker's speech off the information it broadcasts to the other conferees. Another possible cause of clipping is attenuated speech levels at the beginning of a burst due to the nature of the modulators/demodulators used. If this becomes a problem additional storage 15 is added to the speech field of secondary memory which is used to delay the talker's speech by the number of bits (i.e. number of TDM cycles) used for talker detection. On each detection of a talker the all 1's or all 0's word is inserted into the speech delay word for the conference concerned.

Note that although the system has been described for deltamodulated system it could also be adapted to the use of both conventional pulse code modulation and pulse amplitude modulation.

A further point to be noted is that a conference circuit such as described herein could be used in a non-TDM exchange, in which case the highways 1 and 2 have "modem" at their exchange ends.

Integrated circuit modules available from many different manufacturers can be employed to construct the conference circuit of FIGS. 1 and 2. For instance, employing integrated circuit modules manufactured by Texas Instruments, Inc., the specification and characteristics of operation of which are fully described in the "Integrated Circuit Catalog for Design Engineers," First Edition published by Texas Instruments, Inc., the various blocks of FIGS. 1 and 2 would include the integrated circuit modules and number thereof as listed in the following TABLE.

TABLE

| Drawing Block | Integrated Circuit Module Number | Number Employed |
|---|---|---|
| Main Memory 3 | SN7489 | 4 |
| Address Counter 4 | AN7493 | 1 |
| | and | |
| | SN7473 | ½ |
| Speech Detector 5 | SN7400 | 1 |
| | and | |
| | SN7486 | ¾ |
| | and | |
| | SN7404 | ½ |
| | and | |
| | SN7410 | ⅓ |
| Buffer 6 | SN7475 | 1 |
| Secondary Memory 7 | SN7489 | 2 |
| | and | |
| | SN7400 | ¼ |
| Multiplexer 8 | SN7400 | ¾ |
| | and | |
| | SN7404 | 1/6 |
| Comparator 9 | SN7485 | 1 |
| | and | |
| | SN7486 | ¼ |
| | and | |
| | SN7404 | 1/6 |
| Retimer 10 | SN7491 | 3 |
| | and | |

TABLE-Continued

| Drawing Block | Integrated Circuit Module Number | Number Employed |
|---|---|---|
| | SN7496 | 1 |
| | and | |
| | SN7474 | 1 |

While I have described above the principles of my invention in connection with specific apparatus it is to be clearly understood that this description is made only by way of example and not as a limitation to the scope of my invention as set forth in the objects thereof and in the accompanying claims.

I claim:

1. A digital conference circuit for an automatic telephone exchange comprising:

a first TDM (time division multiplex) signal input highway from said exchange to said circuit;

a second TDM signal output highway from said circuit to said exchange;

a main memory having M storage sections each associated with a different one of M channels of said TDM signal, where M is an integer greater than one;

addressing means coupled to said main memory to select in sequence each of said storage sections;

inputs from said exchange coupled to said main memory to set up a conference for N subscribers, said conference being identified by a given digital number which is stored in each of N of said storage sections, each of said N subscribers being connected to said circuit by a different one of N of said channels of said TDM signal, each of said N channels corresponding to a different one of said N of said storage sections, where N is an integer greater than one but less than M; and detection and storage means coupled to said addressing means, said first and second highways and said main memory, said detection and storage means being responsive to speech from one of said N subscribers in said conference to cause code representations of each speech sample from said one of said N subscribers to be transmitted to the others of said N subscribers in said conference over said second highway in the appropriate ones of said N of said channels of said TDM signal and to transmit a no-signal code to said one of said N subscribers over said second highway in the appropriate one of said N of said channels of said TDM signal.

2. A circuit according to claim 1, wherein said main memory, said addressing means and said detection and storage means are capable of establishing a plurality of simultaneous conferences which can be of different sizes.

3. A circuit according to claim 2, wherein said main memory includes a conference identity memory section having a first group of M storage sections in which said given digital number identifying said conference is stored in the appropriate N of said first group of M storage sections, and a speech detection memory section having a second group of M storage sections associated with said first group of M storage sections to store speech codes of said N subscribers in the appropriate N of said second group of M storage sections.

4. A circuit according to claim 3, wherein said addressing means includes an M state binary counter.

5. A circuit according to claim 4, wherein said detection and storage means includes a speech detection circuit coupled to said first highway and said main memory to detect coded speech samples from said one of said N subscribers and to couple said detected coded speech samples to the appropriate one of said second group of M storage sections, a secondary memory coupled to said main memory, said speech detection circuit and said addressing means, said secondary memory storing said given digital number received from said main memory, the identity of said one of said N subscribers received from said addressing means and said detected coded speech samples from said speech detection circuitry, and output means coupled to said secondary memory to transmit said detected coded speech samples stored in said secondary memory to said second highway for distribution to said others of said N subscribers and to transmit said no-signal code to said second highway for coupling to said one of said N subscribers.

6. A circuit according to claim 5, wherein said output means includes a comparator coupled to said secondary memory and said addressing means to produce a control signal when the address of said one of said N subscribers is present at the output of said secondary memory and said addressing means simultaneously, and a multiplexer coupled to said second highway, said comparator and a source of said no-signal code, said multiplexer transmitting said detected coded speech samples to said second highway during the absence of said control signal and transmitting said no-signal code to said second highway during the presence of said control signal.

7. A circuit according to claim 5, wherein information stored in said secondary memory is updated under control of said speech detection circuit.

8. A circuit according to claim 1, wherein said main memory includes a conference identify memory section having a first group of M storage sections in which said given digital number identifying said conference is stored in the appropriate N of said first group of M storage sections, and a speech detection memory section having a second group of M storage sections associated with said first group of M storage sections to store speech codes of said N subscribers in the appropriate N of said second group of M storage sections.

9. A circuit according to claim 1, wherein said addressing means includes an M state binary counter.

10. A circuit according to claim 1, wherein said detection and storage means includes a speech detection circuit coupled to said first highway and said main memory to detect coded speech samples from said one of said N subscribers and to couple said detected coded speech samples to the appropriate one of said M storage sections, a secondary memory coupled to said main memory, said speech detection circuit and said addressing means, said secondary memory storing said given digital number received from said main memory, the identity of said one of said N subscribers received from said addressing means and said detected coded speech samples from said speech detection circuitry, and output means coupled to said secondary memory to transmit said detected coded speech samples stored in said secondary memory to said second highway for distribution to said others of said N subscribers and to transmit said no-signal code to said second highway for coupling to said one of said N subscribers.

11. A circuit according to claim 10, wherein said output means includes a comparator coupled to said secondary memory and said addressing means to produce a control signal when the address of said one of said N subscribers is present at the output of said secondary memory and said addressing means simultaneously, and a multiplexer coupled to said second highway, said comparator and a source of said no-signal code, said multiplexer transmitting said detected coded speech samples to said second highway during the absence of said control signal and transmitting said no-signal code to said second highway during the presence of said control signal.

12. A circuit according to claim 10, wherein information stored in said secondary memory is updated under control of said speech detection circuit.

13. A circuit according to claim 1, further including a first additional storage means for each of said M storage sections of said main memory coupled to said detection and storage means a multiplexer having its output coupled to said second highway;

a second additional storage means for each of said M storage sections of said main memory coupled to said multiplexer, said second additional storage means storing predetermined digitized tones for each of said M storage sections; and additional inputs from said exchange connected to said first and second storage means, said additional inputs activating said first storage means to produce an output signal to inhibit said detection and storage means and to substitute the appropriate one of said digitized tones for said code representations of each speech sample from said one of said N subscribers.

14. A circuit according to claim 1, further including additional means associated with said detection and storage means to delay said code representation of each speech sample from said one of said N subscribers prior to transmission to said second highway to prevent loss of speech at the time of responding to speech from said one of said N subscribers.

* * * * *